May 11, 1937.  R. J. S. PIGOTT  2,080,183
VOLUMETRIC METER
Filed Nov. 5, 1935
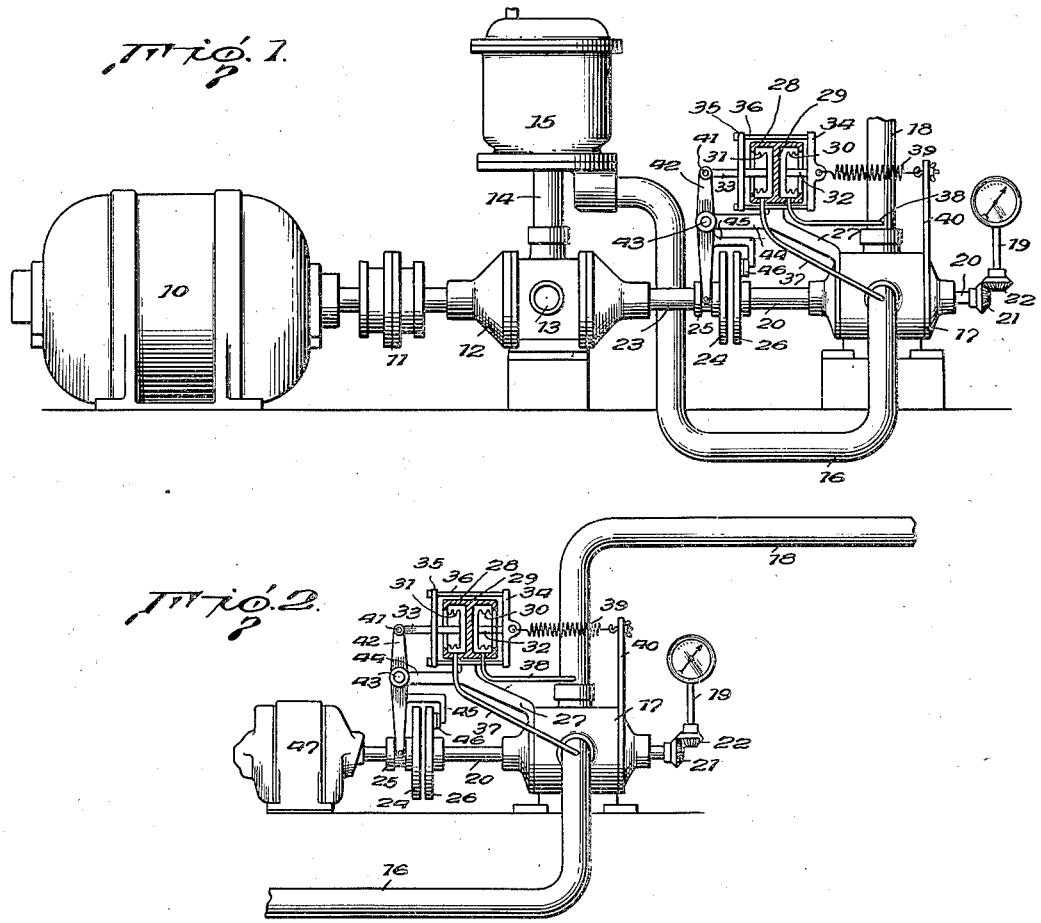
Inventor
Reginald J. S. Pigott,
By G. M. Houghton
his Attorney Patented May 11, 1937

2,080,183

UNITED STATES PATENT OFFICE 2,080,183

VOLUMETRIC METER

Reginald J. S. Pigott, Pittsburgh, Pa., assignor to Gulf Research & Development Company, Pittsburgh, Pa., a corporation of Delaware Application November 5, 1935, Serial No. 48,433

3 Claims. (Cl. 73—199)

This invention relates to volumetric meters and it comprises a device for obviating slip and thereby increasing the accuracy of such meters, which device maintains a substantially zero pressure drop between the inlet and outlet of a meter irrespective of variations in the flow of liquid therethrough, or of loads imposed by the frictional resistance of its moving parts and attached indicating devices; the invention comprising pressure responsive means individually subjected to liquid pressure at the inlet and outlet, respectively, of a meter and so constructed as to prevent the flow of liquid therethrough to bypass the meter, such pressure responsive means being actuated upon an increase in the pressure differential across the meter above zero to cause a motor to drive the meter and thus, by relieving it of its retarding load, to reduce the pressure differential to practically a zero value and so maintain it in order that the meter shall accurately measure the flow of liquid; all as more fully hereinafter set forth and as claimed.

The energy required to drive a meter and its attached indicating devices is derived from the liquid flowing through it and is observable as a difference in pressure between its inlet and outlet. If the rate of flow varies there will be a noticeable variation in the pressure drop across the meter. Where a meter designed for low rates of flow is subjected to liquids flowing at higher velocity than its normal capacity, there will be an appreciable slippage as well as leakage of the joints and packings of the meter mechanism. Such leakage and slip contribute to the inaccuracy of meter readings.

Two general types of meter have been developed; one in which the contacting surfaces are sealed by soft or metallic packing to prevent leakage, and the other effecting a seal by the provision of small clearances between the moving and fixed parts which are in the nature of capillary passages. The latter type of meter has low resistance to rotation but although the former shows larger pressure drop between the inlet and outlet in operation it is in general more accurate at low rates of flow. However, with both types of meter, the attachment of such devices as gallonage recorders and computing devices as in the newly developed dispensing pumps, adds load to the meter, increases the pressure drop and consequently the leakage. Inasmuch as the mechanism of my invention will assume the meter load and reduce the pressure drop substantially to zero the need for careful packing it obviated and the accuracy of the meter readings is accordingly enhanced.

Various attempts have heretofore been made to relieve a meter of fluctuating loads by means which are responsive to variations in the pressure differential, and which are rotated by a bypassing flow of liquid from inlet to outlet of the meter for actuating the meter driving device. Such attempted solutions of the problem are inadequate since they rely upon the establishment of a flow of liquid around the meter when the pressure at the inlet increases beyond a desirable value. In the operation of such devices the liquid which would otherwise flow through the meter to be measured is, instead, bypassed around it. The desirable results of driving the meter to relieve it of load are thereby largely nullified.

Various other expedients have been resorted to, such as mechanisms for computing the loss by leakage and slip, but these are delicate and complicated, and do not offer an adequate remedy for inaccurate meter operation.

It is accordingly an object, which is accomplished by my invention, to provide a means which is responsive to pressures at both inlet and outlet of the meter, but which does not offer communication therebetween for the flow of any liquid around the meter, such means being responsive to fluctuations of pressure to throw in a motor which assumes the meter load, the meter being thereby directly coupled to the motor shaft and being driven thereby until the zero pressure differential for accurate measurement is reestablished.

A further object is to provide means in communication with the inlet and outlet, respectively, of a meter, but which does not establish communication between the two, such means being influenced by variations in pressure differential across the meter to actuate a clutch and thereby couple a motor to the meter shaft for overcoming its resistance to rotation and restoring the zero pressure drop which is desirable for accurate measurement of liquid flow, whereupon the pressure responsive means will cause disengagement of the clutch and will prevent reengagement so long as the zero differential in pressure exists.

A still further object of my invention is to provide means for automatically driving a meter and thereby relieving it of its own friction load or any externally added load causing increase of pressure differential thereacross, and a braking means automatically applied to the meter shaft upon disengagement of the driving means to prevent its overrunning when the zero pressure differential is reestablished.

Other and further objects will be apparent from the following description and drawing, in which Fig. 1 is a side elevation, partly in section, of a pump and meter assembly with pressure responsive means in communication with the inlet and outlet of the meter;

Fig. 2 is a side elevation, partly in section, of pressure responsive means in assembly, which includes a light driving motor to be coupled to the meter shaft by the pressure responsive actuating mechanism of my invention.

Referring more particularly to the drawing:

A motor 10 is connected through coupling 11 to drive a pump 12 which has a suction line 13 and a discharge line 14 in communication with an air separator 15. Liquid, such as gasoline, having been relieved of entrained air in the separator 15, flows through pipe 16 into a meter 17 of conventional construction and emerges from the meter through pipe 18 to a point where it is dispensed. The meter may have an indicating device 19, or computing mechanism, attached to it and driven from its shaft 20, as through meshing gears 21 and 22. In alluding to indicating devices the term is used to designate any indicator, recorder or register which is susceptible of use with fluid meters.

The motor driven shaft 23 of the pump terminates in a clutch plate 24 with an attached yoke engaging collar 25 splined to the shaft. An opposing clutch plate 26 is mounted to rotate with the meter shaft 20.

A bracket 27 is bolted or otherwise affixed to the meter housing and serves as a support for the pressure responsive means which consists of a housing 28 centrally divided by a partition wall 29 into opposed, uncommunicating compartments. Flexible bellows 30 and 31 seal the open ends of such compartments and serve to actuate rods 32, 33, when they are subjected to the pressure of fluid admitted to the respective compartments. The rods carry cross heads 34 and 35 which are connected by a plurality of bolts as at 36, thereby to cause the rods and bellows to move in unison. Thus, when pressure is admitted to one of the opposed chambers in excess of the pressure in the other chamber, one bellows will be collapsed while the other will be extended.

A pipe 37 extends from the pipe 16 at the inlet of the meter to the interior of one of the separated chambers within the housing 28, and a similar pipe 38 establishes communication between the other chamber and the outlet pipe 18 of the meter. A spring 39 is attached at one end to a fixed support 40 and at its other end to the cross head 34, thereby to urge the respective bellows in chamber 28 in a direction to oppose the pressure of liquid at the inlet of the meter, thus providing means of adjusting the action.

The rod 33 is pivoted as at 41 to a rocker arm 42, which is mounted to swing about a pivot 43 on a branch arm 44 of the bracket 27. The rocker arm carries the brake arm 45 with an attached shoe 46 which is adapted to bear against the rear face of clutch plate 26 when the clutch is disengaged, thereby preventing overrunning of the meter shaft 20 when the zero pressure differential has been established, as will be subsequently described.

Another form of the invention is shown in Fig. 2, this being similar to the assembly previously described, except that it omits the liquid pump. In this form of my invention the power for driving the meter, when occasion arises, is derived from a small constantly running motor 47 which may be connected through conventional circuits to operate at all times when liquid is flowing through the meter.

In operation, if the pressure drop across the meter increases, that is if any excess pressure builds up at the inlet over the discharge pressure, such pressure will be transmitted to the bellows 31, (Fig. 1) and will collapse this bellows, (i. e. enlarge the chamber) thereby moving the rod 33 to the left and, through the cross arms 34, 35 and the connecting bolts 36, will extend the bellows 30 and tension the spring 39. Such movement will rock the lever 42 about its pivot in a counter-clockwise direction and will cause engagement of the clutch faces 24 and 26 so that the meter shaft 20 will be positively driven by the motor 10, or the motor 47, as the case may be. The moving mechanism of the meter being thus driven, the pressure differential between inlet and outlet will approach zero. Before this limit is reached, however, the bellows 31 will tend to return to its normal position in the chamber which communicates with the meter inlet, and the bellows 30 will be collapsed in response to outlet pressure, thereby swinging the rocker arm 42 to disengage the clutch and to permit the shaft 20 to rotate under the influence of the liquid flowing through the meter.

The spring 39 is adjustably tensioned by means such as the wing nut shown in Figs. 1 and 2. It provides a fine and accurate adjustment for the clutch operating mechanism by making the bellows responsive at any desired pressure differential from substantially zero upwardly. Such close adjustment is provided by the spring that when the differential is nearly zero the clutch, instead of "fluttering" in and out of engagement, actually comes to an equilibrium position in which there is sliding friction, the motor shaft and meter shaft rotating at different speeds. At higher differentials the clutch becomes fully engaged.

Since there may be some tendency to overdrive the meter shaft due to lag in the action of the bellows mechanism, the brake shoe 46 is applied to the clutch plate 26 so as to retard its overrunning and, consequently, to reduce the rotation of the meter shaft 20 to accord with the rate of flow of liquid through the meter. The clutch brake is not an essential feature of the invention, since under ordinary conditions the liquid passing through the meter exerts a sufficient retarding effect to prevent overrunning, and will immediately tend to slow down the rotation of shaft 20 to the speed at which it would be driven by the liquid if no motor drive were used. The brake, however, is a desirable adjunct of the mechanism.

Various other modifications of the invention are within its purview although not shown and described, since they do not contribute to a better understanding of the invention.

From the foregoing it will be apparent that my invention provides a device for maintaining a substantially zero pressure drop across the meter of a liquid measuring apparatus, and is responsive to variations in such pressure drop to couple a motor with the meter and thereby relieve it of its retarding load, whereby the rotating mechanism of the meter will operate at all times without slip or leakage of liquid therepast, although the necessity for careful packing is obviated; the pressure responsive means offering no communication for the flow of liquid around the meter, so that all liquid must pass through the meter for measuring.

What I claim is:

1. Metering apparatus for liquids comprising a meter adapted to indicate the quantity of liquid passing through it, a shaft extending from the meter and rotated by the flow of liquid, a motor adapted to run during operation of the meter, a normally disengaged clutch between the motor and the meter shaft, a divided chamber having separate compartments in communication with the inlet and outlet, respectively of the meter, a bellows in each compartment of said chamber responsive to liquid pressure, means connecting said bellows to operate in unison and for actuating said clutch upon the establishment of an undesired pressure differential between the inlet and outlet of the meter, whereby the motor will be directly coupled to the meter to assist in driving the same and thereby will reduce the pressure differential to a desired value.

2. Metering apparatus for liquids comprising a meter adapted to indicate the quantity of liquid passing through it, a shaft extending from the meter and rotated by the flow of liquid, a motor adapted to run during operation of the meter, a normally disengaged frictional clutch between the motor and the meter shaft, a divided chamber having separate compartments in communication with the inlet and outlet, respectively of the meter, a bellows in each compartment of said chamber responsive to liquid pressure, means connecting said bellows to operate in unison and for actuating said clutch upon the establishment of an undesired pressure differential between the inlet and outlet of the meter, a spring opposing movement of said bellows in a direction to engage the clutch, means for adjustably tensioning said spring, whereby when the clutch is engaged the motor will assist in driving the meter and when the pressure differential approaches the desired value the said spring under tension will bring the clutch to an equilibrium position at which there is sliding friction, and will thereby obviate its fluttering.

3. Metering apparatus for liquids comprising a meter adapted to indicate the quantity of liquid passing through it, a shaft extending from the meter and rotated by the flow of liquid, a motor adapted to run during operation of the meter and to be coupled thereto as conditions may require to assist in driving the same, a normally disengaged clutch between the motor and the meter shaft, a chamber formed with uncommunicating compartments connected with the inlet and outlet, respectively, of the meter, a movable head in each compartment and expansible bellows connecting each head with the walls of its respective compartment, thereby to define separate expansible chambers, a yoke connecting said heads to travel in unison, and a clutch operator responsive to movement of said heads and yoke to engage said clutch upon an increase in pressure differential between the inlet and outlet of the meter, thereby to drive a meter shaft by running of the motor and to reduce the pressure differential to a desired value, whereupon by the return of the heads to normal position in their respective compartments, the clutch will again be disengaged.

REGINALD J. S. PIGOTT.